June 23, 1959
L. JACKSON
2,891,346
ANIMAL TRAPS
Filed June 16, 1958
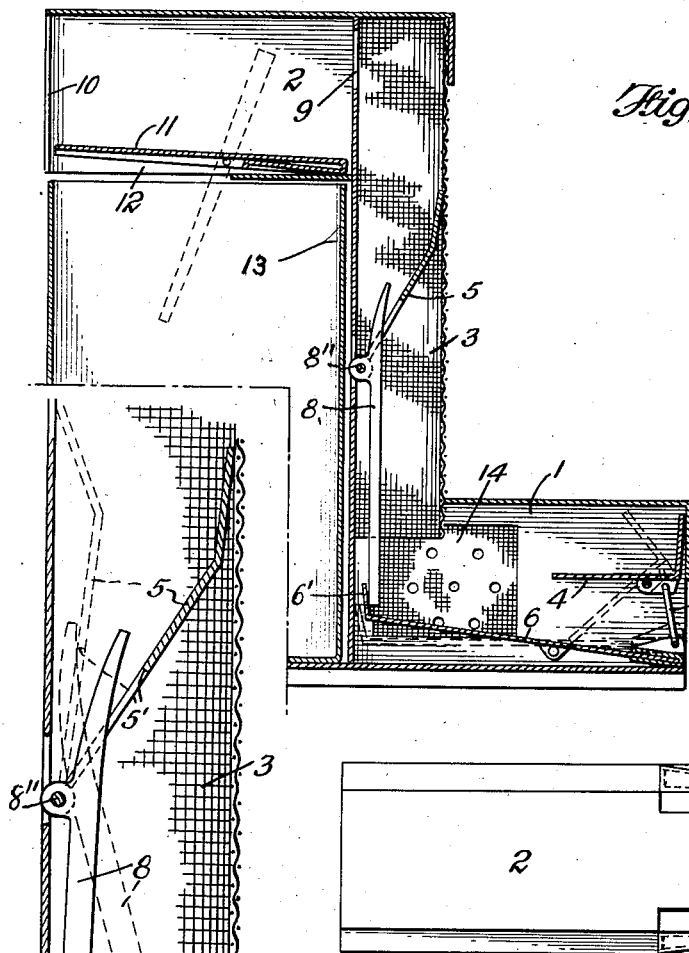
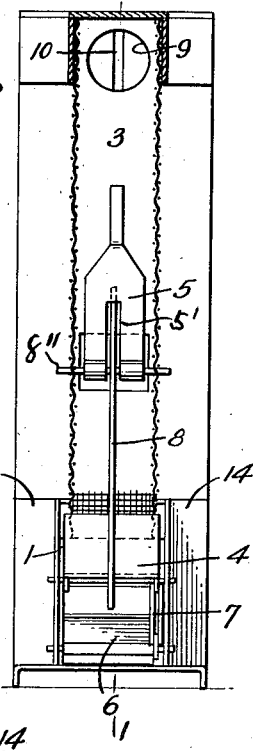
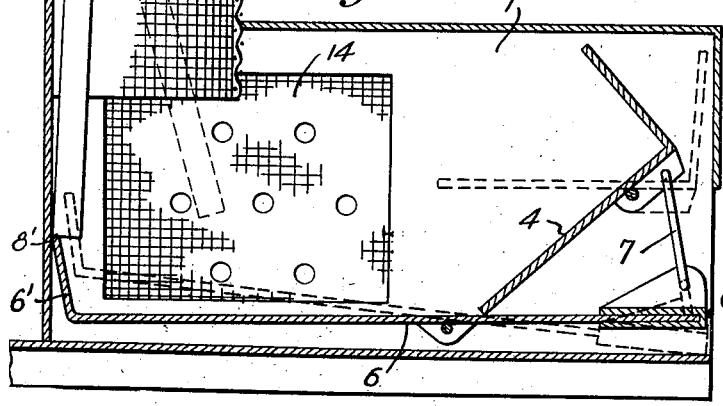
INVENTOR
Lewis Jackson,
George M. Anderson
ATTORNEY 2,891,346

ANIMAL TRAPS

Lewis Jackson, Simpson, Kans.

Application June 16, 1958, Serial No. 742,231

1 Claim. (Cl. 43—76)

The invention relates to animal traps, primarily mouse and rat traps of the victim reset variety, an object of the invention being to provide an improved trap of this description which is fully automatic, having no springs and no triggers to be manually set and in which the entrance door is pivoted and held closed by a latch lever, said latch lever being released by a second pivoted gravity closed door during its opening movement said gravity closed door being pivoted upon the same shaft as that upon which said latch lever is fulcrumed. Other objects and advantages will appear hereinafter or will be obvious.

The invention consists in the novel construction and combinations of parts as hereinafter set forth in the claim.

In the accompanying drawings:

Figure 1 is a section on the line 1—1, Fig. 2, with the trap in normal set position, and parts broken away.

Figure 2 is a front view of the trap, the vertical runway being shown in section.

Figure 3 is a plan view of the trap.

Figure 4 is a view similar to Fig. 1, on a larger scale, the trap being shown in animal operated position, with parts broken away.

6 designates a platform overlying the floor of the horizontal runway and mounted intermediate its ends for pivotal movement therein, the rear end of the platform being in line with the vertical runway and provided with an upstanding extension 6', said platform being adapted to have its forward end depressed and its rear end raised under the influence of gravity in normal set position and having an operating link connection 7 with the entrance door 4, which is normally open. 8 designates an upstanding latch lever in the vertical runway above said upstanding extension, said latch lever being fulcrumed intermediate its ends at 8" to swing freely about a horizontal axis or shaft 8"', the lower end of the latch lever normally lying in front of said upstanding extension 6' when the platform is in its normal set position and being adapted to be caught in engagement with said upstanding extension after the platform is operated by an animal to depress its rear end and raise its forward end and close the entrance door 4. The gravity closed door 5 is pivotally mounted at its lower end to swing freely about the same horizontal axis or shaft 8"' as that upon which said latch lever is fulcrumed, said door having a slot 5' in its lower end engaged by the upper arm of the latch lever and being normally disposed to rest across the vertical runway to close it under the influence of gravity, said door being adapted to be pivotally moved transversely of the vertical runway to open it and to simultaneously engage the upper end of the latch lever to trip the latch lever from its said caught engagement with said upstanding extension upon passage of the animal up the vertical runway, whereupon said platform and said latch lever will become reset by gravity to normal position, the entrance door 4 being simultaneously opened.

The animal seeking escape, passes from the vertical runway through the front opening 9 of the upper runway and is lured forwardly by the light admission opening 10 in the rear wall of the upper runway, thereby depressing the rear arm of a pivoted platform 11 overlying the floor of the upper runway, the animal falling through the opening 12 of said floor into a can 13 containing water located immediately below said opening. Lateral chambers 14 adapted to contain bait are located rearwardly of the lower runway to lure the animal forwardly, said chambers having inner wire mesh coverings and outer air admission openings. The front and lateral walls of the vertical runway are constituted by wire mesh as shown.

The pivoted entrance door 4 is positively operated to open and close the entrance and will not jam during its opening and closing movements, whereas a sliding door operated by gravity to close the entrance tends to jam.

The latch lever for holding the platform 6 in operated position and the entrance door closed is releasable by a mere touch of the gravity closed door during its opening movement to enable said platform 6 and said entrance door to be restored to normal position. The lower end of the latch lever in swinging by gravity to latching position is prevented from moving beyond latching position by stop engagement at 8' with the rear wall of the vertical runway, or by other suitable means.

The right is reserved to modifications coming within the scope of the claim.

I claim:

An animal trap, comprising a lower horizontal runway, normally open at one end to receive an animal, an upper horizontal runway, a vertical runway connecting the forward end of one of said runways to the rear end of the other of said runways, a platform overlying the floor of the lower horizontal runway and mounted intermediate its ends for pivotal movement therein, the rear end of the platform being in line with the vertical runway and provided with an upstanding extension, said platform being adapted to have its forward end depressed and its rear end raised under the influence of gravity in its normal set position, means controlling the open end of said lower runway to close it and open it, an upstanding latch lever in the vertical runway above said upstanding extension fulcrumed intermediate its ends to swing freely about a horizontal axis, the lower end of the latch lever normally lying in front of said upstanding extension when the platform is in its normal set position and being adapted to be caught in engagement with said upstanding extension after the platform is operated by an animal to depress its rear end and raise its forward end to actuate said controlling means to close the open end of said runway and a gravity closed door in the vertical runway pivotally mounted at its lower end to swing freely about the same horizontal axis as that about which said latch lever is fulcrumed, said door having a slot in its lower end engaged by the upper end of said latch lever and being normally disposed to rest across the vertical runway to close it under the influence of gravity, said door being adapted to be pivotally moved transversely of the vertical runway to open it by an animal in its passage up the vertical runway and to simultaneously engage the upper end of the latch lever to trip the latch lever from its said caught engagement with said upstanding extension, whereupon said platform and said latch lever will become reset by gravity to normal position thereby actuating said controlling means to open the end of said lower runway.

References Cited in the file of this patent

UNITED STATES PATENTS

| 2,087,137 | Bratkowski | July 13, 1937 |

FOREIGN PATENTS

| 9,672 | Great Britain | June 8, 1891 |
| 150,079 | Germany | Mar. 30, 1904 |
| 159,670 | Germany | Apr. 3, 1905 |
| 405,607 | Germany | Apr. 18, 1924 |